United States Patent
Hutter et al.

(10) Patent No.: US 9,020,268 B2
(45) Date of Patent: Apr. 28, 2015

(54) METHOD AND APPARATUS FOR ANNOTATING MULTIMEDIA DATA IN A COMPUTER-AIDED MANNER

(75) Inventors: Andreas Hutter, München (DE); Thomas Riegel, Hohenbrunn (DE); Tobias Schwarze, Hildesheim (DE)

(73) Assignee: Siemens Aktiengesellschaft, Munich (DE)

( * ) Notice: Subject to any disclaimer, the term of this patent is extended or adjusted under 35 U.S.C. 154(b) by 224 days.

(21) Appl. No.: 13/508,312

(22) PCT Filed: Nov. 3, 2010

(86) PCT No.: PCT/EP2010/066727
§ 371 (c)(1),
(2), (4) Date: May 4, 2012

(87) PCT Pub. No.: WO2011/054858
PCT Pub. Date: May 12, 2011

(65) Prior Publication Data
US 2012/0219223 A1    Aug. 30, 2012

(30) Foreign Application Priority Data

Nov. 4, 2009 (DE) .......... 10 2009 051 895
Dec. 29, 2009 (DE) .......... 10 2009 060 687

(51) Int. Cl.
*G06K 9/46* (2006.01)
*G06K 9/66* (2006.01)
*G06F 17/30* (2006.01)
(Continued)

(52) U.S. Cl.
CPC ...... *G06F 17/30817* (2013.01); *G06K 9/00261* (2013.01); *G06K 9/00718* (2013.01); *G06K 9/6255* (2013.01); *G06K 2209/27* (2013.01); *G06F 17/30793* (2013.01)

(58) Field of Classification Search
USPC .......... 382/190; 709/204, 250, 217, 230, 224, 709/223, 238; 348/552; 706/927, 902; 715/234
See application file for complete search history.

(56) References Cited

U.S. PATENT DOCUMENTS 6,906,643 B2 * 6/2005 Samadani et al. ....... 340/995.18
6,961,954 B1 * 11/2005 Maybury et al. ................ 725/53
(Continued)

FOREIGN PATENT DOCUMENTS

CN    1906610 A    1/2007
CN    101273351 A    9/2008
(Continued)

OTHER PUBLICATIONS

Ming Li et al; "Synopsis Alignment: Importing External Text Information for Multi-Model Movie Analysis"; Proceedings of 9th Pacific Rim Confer\- ence on Multimedia Advances in Multimedia Information Processing (PCM 2008); Springer Verlag; Berlin, Germ~ 2008; pp. 287-295.*

(Continued)

*Primary Examiner* — John Strege
(74) *Attorney, Agent, or Firm* — Staas & Halsey LLP

(57) ABSTRACT

Annotation of a sequence of digitized images in multimedia data is aided by a computer analyzing the multimedia data to identify one or more objects and assigning each object to a respective role. The role assignment is determined by processing context information representing a model of the multimedia data.

16 Claims, 2 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 7,554,576 B2* | 6/2009 | Erol et al. | 348/211.3 |
| 7,765,574 B1* | 7/2010 | Maybury et al. | 725/105 |
| 7,793,212 B2* | 9/2010 | Adams et al. | 715/233 |
| 8,175,376 B2* | 5/2012 | Marchesotti et al. | 382/159 |
| 2007/0061352 A1 | 3/2007 | Dimitrova et al. | |
| 2008/0088698 A1 | 4/2008 | Patel et al. | |
| 2008/0235724 A1 | 9/2008 | Sassenscheidt et al. | |
| 2009/0103887 A1 | 4/2009 | Choi et al. | |
| 2009/0116815 A1 | 5/2009 | Ryu | |

FOREIGN PATENT DOCUMENTS

| | | |
|---|---|---|
| CN | 101502088 A | 8/2009 |
| DE | 102009051895.9 | 11/2009 |
| DE | 102009060687.4 | 12/2009 |
| WO | 2005/055196 A2 | 6/2005 |

OTHER PUBLICATIONS

Jeroen et al., "Multimodal Person Identification in Movies"; Proceedings of Image and Video Retrieval International Conference (CIVR 2002); Lecture Notes in Computer Science, vol. 2383; Springer-Verlag; Berlin, Germany; 2002; pp. 175-185.*

Office Action mailed Dec. 17, 2013 in corresponding European Application No. 10776338.5.

Ming Li et al; "Synopsis Alignment: Importing External Text Information for Multi-Model Movie Analysis"; Proceedings of 9th Pacific Rim Conference on Multimedia Advances in Multimedia Information Processing (PCM 2008); Springer Verlag; Berlin, Germany; 2008; pp. 287-295.

"Internet Movie Database", Oct. 6, 2009, printed Jan. 19, 2011 from de.wikipedia.org/w/index.php?title=Internet_Movie_Database&oldid=65297992; 4 pp.

Vendrig J et al; "Multimodal Person Identification in Movies"; Proceedings of Image and Video Retrieval International Conference (CIVR 2002); Lecture Notes in Computer Science, vol. 2383; Springer-Verlag; Berlin, Germany; 2002; pp. 175-185.

International Search Report for PCT/EP2010/066727; mailed Feb. 16, 2011.

Office Action mailed Dec. 2, 2013 in corresponding Chinese Patent Application No. 201080050024.8.

* cited by examiner

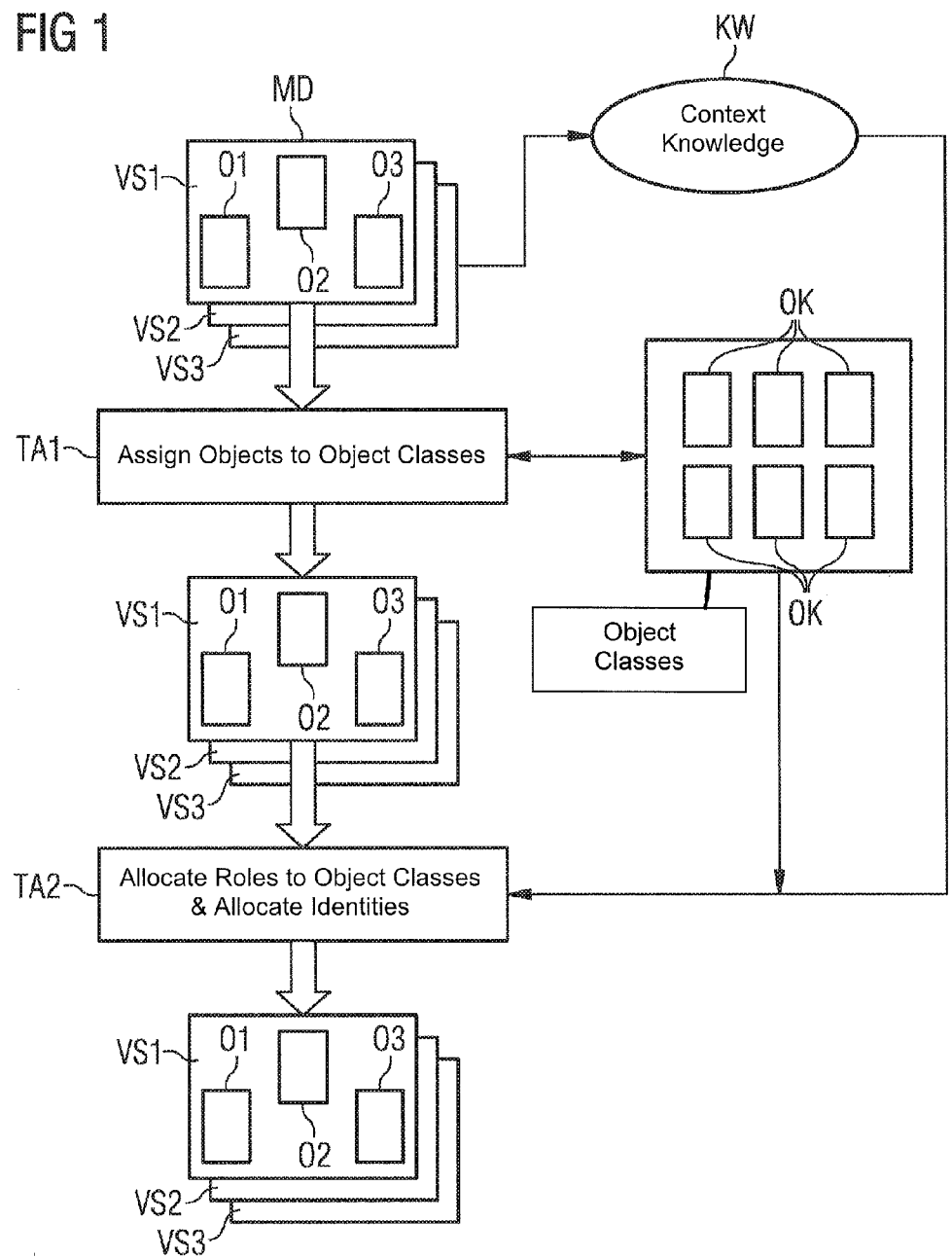

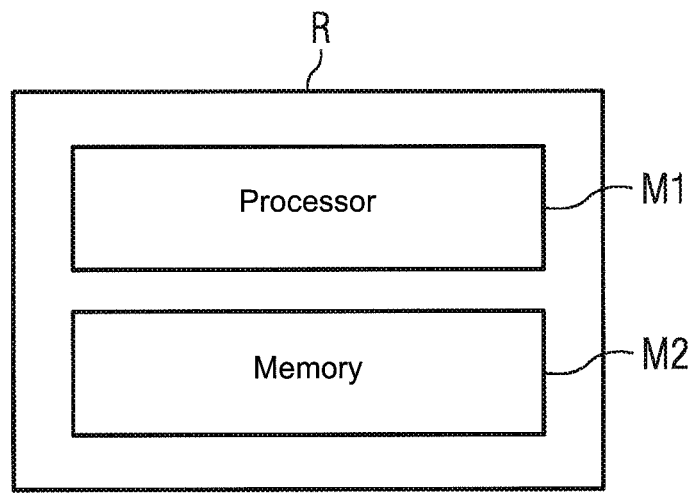

METHOD AND APPARATUS FOR ANNOTATING MULTIMEDIA DATA IN A COMPUTER-AIDED MANNER

CROSS REFERENCE TO RELATED APPLICATIONS

This application is the U.S. national stage of International Application No. PCT/EP2010/066727, filed Nov. 3, 2010 and claims the benefit thereof. The International Application claims the benefit of German Application No. 10 2009 051 895.9 filed on Nov. 4, 2009 and German Application No. 10 2009 060 687.4 filed on Dec. 29, 2009, all applications are incorporated by reference herein in their entirety.

BACKGROUND

A problem with multimedia data formed of a sequence of digitized images lies in automatically recognizing what is represented in the individual images so that the multimedia data can be annotated based on the content. The aim in particular is to annotate the multimedia data such as to indicate what persons (which is to say their identity) are represented therein. Annotating can relate also to a context associated with the objects represented such as, for example, when the multimedia data was produced, in what connection it was produced, and whether inside or outside recordings are shown, etc.

In this connection it is known how first to disassemble the multimedia data into individual scenes, meaning into images that are logically or semantically connected. Persons are detected automatically by face-recognition software. Distinguishing between persons is also made possible by analyzing their speech so they can be differentiated on the basis of different speech profiles. Persons who have been recognized are usually identified through a comparison with information stored in a database in which reference information concerning phonetics and/or visual features for respective persons has been filed. If, though, a person represented in the multimedia data is not in the database file, then identifying in that way will not be possible.

Other methods employ an internet search for annotating the multimedia data. That entails first searching for manually annotated images for persons requiring to be annotated. The characteristics ascertained for the images that were found are then compared with those of the persons represented in the multimedia data. If they tally, the multimedia data can be annotated with a specific person by transferring the manual annotation from the image.

The processes known from the related art require manual interventions in practically all cases so that the annotating of multimedia data cannot be automated.

SUMMARY

Described below is a method by which multimedia data can be annotated with computer support, which is to say automatically. Also described below is a device that will enable multimedia data to be annotated automatically with computer support.

The method provides computer-aided annotating of multimedia data formed of a sequence of digitized images. The method includes: performing an analysis of the multimedia data for detecting one or more objects in the multimedia data; and assigning the object(s) in each case to a role, with role assigning being made possible by processing context information representing a model of the multimedia data.

What in the description that follows is understood by a "role" is in particular a person's function in the multimedia data. The person's function is assessed according to, for example, a text assigned to the person.

What in the present description is understood by an "object" is in particular a person represented in the multimedia data. An object can, though, also be something else.

An advantage of the method is that annotating the multimedia data can be performed with computer support and automatically. No manual procedures are necessary between analyzing the multimedia data and assigning the objects ascertained thereby to a role, as a result of which the method will be quick and efficient.

The context information is in particular ascertained from an information source different from the multimedia data. That means in other words that the context information neither originates in the multimedia data nor is taken from it. The context information includes, for example, background information about the multimedia data requiring to be analyzed provided by a service owner or in another way.

According to an expedient embodiment, the objects are assigned to object classes, with an object class including objects identified as being similar so that it can be assumed that with high probability they are one and the same object. An object class is thus a grouping of similar objects. The objects can be assigned to a role more simply and quickly by forming the object classes first.

For categorizing two objects as similar, in particular an object-specific similarity measure is determined for the two objects that takes account of visual and/or phonetic and/or geometric characteristics of the objects. Objects can be registered as being similar by means of, for example, a face-tracking process or a similarity check based on visual features. Phonetic similarities between the objects ascertained in the multimedia data are detected by means of, for instance, a speech analysis.

According to another expedient embodiment, an identity is ascertained for a respective role. An object's, in particular a person's, identity defines the peculiarity that characterizes the object's intrinsic nature and distinguishes it from other objects. The method's multi-stage structure, the detecting of objects through object observing, assigning the objects to at least one object class, assigning the object class or classes to a role, and assigning a respective role to an identity will enable the compute effort required by the method to be kept low and the reliability of allocating the identities to the objects to be enhanced. Quick convergence will in particular be achieved.

According to another embodiment, the identity is ascertained on the basis of the ascertained role by processing the context information. It is furthermore expedient for an identity that has been ascertained to be assigned to the relevant object and/or object class.

In another expedient embodiment, the context information includes information about identities involved in the multimedia data. The identities are roles to which the observed, unknown objects are to be assigned. It is possible for an identity also to be able to assume a plurality of roles over the course of the multimedia data. If the role changes over time, then identification will only be clear from a combination of the role and a timestamp.

The context information optionally further includes statistical or procedural knowledge about a context of the multimedia data. The knowledge can be, for instance, the customary sequence of events in a television program including, for example, a list of opening credits, an ensuing interview with a guest, a recorded report about the guest or a product being promoted by the guest, etc. There will be statistical knowledge when, for example, the frequency of an object's occurrence in the multimedia data is ascertained. Given the appropriate context, conclusions can be drawn from the information about the object's role or, as the case may be, identity.

The context information can furthermore include logical limitations. If, for example, two identified objects occur simultaneously in an image sequence then they cannot have the same identity. The number of possible assignments of objects to roles or, as the case may be, identities can be reduced owing to that exclusion criterion. The method's convergence can also be accelerated thereby.

In another embodiment the context information includes data from other data sources, particularly from databases containing information about the multimedia data. The data sources can be, for example, electronic program magazines or summaries of a program that is typically available in databases.

Also described is a device for the computer-aided annotating of multimedia data including a sequence of digitized images. The device includes means for performing an analysis of the multimedia data for detecting one or more objects in the multimedia data and for assigning the object(s) in each case to a role, by which role assigning can be ascertained by processing context information, with the context information representing a model of the multimedia data. The model can include a plurality of partial models.

The device described below has the same advantages as those described in connection with the method.

BRIEF DESCRIPTION OF THE DRAWINGS

These and other aspects and advantages will become more apparent and more readily appreciated from the following description of an exemplary embodiment, taken in conjunction with the accompanying drawings of which:

FIG. 1 is a flowchart showing the flow of the method, and

FIG. 2 is a schematic block diagram of a device for the computer-aided annotating of multimedia data.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 is a schematic showing the basic procedure for the computer-aided annotating of multimedia data MD. Multimedia data MD includes a sequence of digitized images, for example of a television program. A number of logically connected images embody a video sequence, three of which video sequences VS1, VS2, VS3 are shown in FIG. 1 by way of example. Contained in each of video sequences VS1, VS2, VS3 are a number of initially unknown objects O1, O2, O3. The three objects O1, O2, O3 shown by way of example in video sequence VS1 are, for instance, persons appearing in a program.

Context knowledge KW assigned to multimedia data MD is used for detecting a role distribution of unknown objects O1, O2, O3 in a known semantic context. It is first expedient for context knowledge KW to include information about the identities involved in the multimedia data. The identities involved are roles to which the unknown objects being observed are to be assigned. In an interview situation there is, for example, an interviewer and an interviewee. An object's assignment to a role finally identifies the object in terms of its respective identity.

It is furthermore expedient for context knowledge KW to include statistical knowledge about the context. The statistical knowledge describes, for example, a generally observable frequency distribution of the occurrence of principal and secondary actors in reports. For example it is known that in interview situations it is the interviewee who is relatively most frequently to be seen in an image sequence. An image sequence can therein correspond to, for example, a video sequence of the multimedia data being analyzed.

Context knowledge KW can furthermore contain information about logical limitations. Logical limitations give, for example, a precluding indication of an object's role association. If two objects occur simultaneously they cannot have the same identity unless an object's reflection is shown in the video sequence.

Context knowledge KW may include additional information sources regarding the identities requiring to be ascertained of the objects contained in the multimedia data. Information sources of such kind can be, for example, a program magazine or a brief textual summary made available in databases.

Flexibly combining those types of context knowledge allows objects O1, O2, O3 contained in multimedia data MD to be assigned to identities. For persons, "identity" refers to the features of someone's nature that characterize that person and distinguish him or her as an individual from others. What in particular is intended to be achieved by the method is to detect what person or persons is/are shown in the multimedia data.

The observing of objects, which is to say analyzing the multimedia data in its entirety or, e.g., respective individual video sequences VS1, VS2, VS3, will not by itself make it possible to determine to what role objects O1, O2, O3 ascertained in multimedia or, as the case may be, respective video sequences VS1, VS2, VS3 belong in the context. Role assigning will, though, be simplified with increasing knowledge about objects O1, O2, O3. An instance of information that is relevant in that regard is the frequency with which individual objects O1, O2, O3 occur in multimedia data MD or, as the case may be, respective video sequences VS1, VS2, VS3.

To enable role assigning it is provided for individual objects O1, O2, O3 to be suitably correlated through observation. That is possible, for example, when there is a visual similarity between objects O1, O2, O3 in different video sequences VS1, VS2, VS3. Assigning is performed by combining TA1 objects O1, O2, O3 that represent the same objects, owing to their visual similarities, into object classes OK that correspond to unknown identities of an object. Instead of many individual objects O1, O2, O3 detected in a video sequence VS1, VS2, VS3 only a few object classes OK are assigned to a role.

As a result of the cluster process in TA1, similar objects among objects O1, O2, O3 ascertained in the multimedia data or respective video sequences VS1, VS2, VS3 are grouped into object classes. The measure of the similarity between two objects O1, O2, O3 is therein object-specific. Alongside visual characteristics, the measure of similarity can be described by, for example, geometric factors. The objects ascertained in multimedia data MD or, as the case may be, video sequences VS1, VS2, VS3 may be processed chronologically to be able to ensure that two objects ascertained simultaneously will not be assigned to the same object class OK.

The result of processing TA1 is the assigning of objects O1, O2, O3 to object classes OK. Be it noted in this connection that object classes OK do not have to be pre-established but instead are generated while multimedia data MD or, as the case may be, respective video sequences VS1, VS2, VS3 are being analyzed.

At TA2, object classes OK that have been found are first allocated roles and the roles then allocated identities. Statistical background knowledge from the context of multimedia data MD or, as the case may be, a respective video sequence VS1, VS2, VS3 therein provides strong evidence in the context of the object-class assignment that has been found and the characteristics of the object classes.

That will be clarified using an interview scenario as an example. The focus of interviews in television reports during talk shows is plainly on the person at whom questions are directed (the interviewee or guest). The main reason for that in the case of an interview is that viewers are more interested in the person being interviewed than in the interviewer. The interviewee will consequently be given preference in the inclusion in the video material. Questioning by the interviewer will furthermore on average be of shorter duration than the interviewee's responses. The interviewee will consequently appear significantly more often and for longer in the video material. The guest's presence in the multimedia data or, as the case may be, individual scenes in the video sequences will as a result be significantly longer than that of the presenter or interviewer.

In the case of an interview between two persons the frequency of their respective appearance will accordingly alone suffice to identify the roles of the two parties (objects). Role assigning can take place with no form of knowledge whatsoever about the parties themselves.

What roles (interviewer or guest(s)) there are in multimedia data MD and which identities perform which role can be taken from context information KW. By processing all the information it can be detected, for example, that in video sequence VS1 object O1 is the interviewee, object O2 is the interviewer, and object O3 is another guest taking part in the program. The roles can be allocated an identity in conjunction with the context knowledge indicating, for example, who the program presenter is and who the invited guests (interviewees) are.

An already ascertained assignment of an identity to an object class and hence to all objects contained therein can simplify the assignment of further, as yet unidentified identities in the multimedia data or respective video sequences VS1, VS2, VS3. If, for instance, it was established that object O1 has been assigned to object class OK1 and the class in turn to identity A, then it will not be possible for an object that is different from O1 to be contained in object class OK1 and hence to correspond to identity A. If, on the other hand, it was established that an initially unknown object is owing to its similarity likewise contained in object class OK1, then that object must also correspond to identity A. Taking account of knowledge that is already known will thereby simplify the further assigning of identities to object classes and to objects.

By continuously processing the multimedia data or, as the case may be, individual video sequences VS1, VS2, VS3 it will thereby be possible to annotate multimedia data on a computer-aided basis.

Trials have shown that unknown objects can be assigned to object classes all the better when smaller sections, which is to say individual video sequences, of the multimedia data are examined separately. For example scenes that will be processed using the available context information are selected from a video recording of the interview. The objects can therein be assigned relatively easily to the roles or, as the case may be, identities.

An additional expansion of the method involves classifying the scenes in the video sequence (an interview situation, for example) on the basis of the (temporally local) clustering in combination with a statistical model of the frequency distributions in a video sequence.

FIG. 2 shows device R for the computer-aided annotating of multimedia data formed of a sequence of digitized images. Device R includes means for performing the analysis of the multimedia data for identifying the object(s) represented in the multimedia data and means for assigning object(s) O1, O2, O3 in each case to a role, by which role assigning can be ascertained by processing context information, with the context information representing a model of the multimedia data. These functions can be realized and implemented in the form of hardware, software, or a combination of hardware and software. Thus a processor M1 with a memory M2 can be provided in the device, where the processor M1 executes the method described above, stored for example as program code in the memory M2, and files results in the memory M2 in an organized manner. Alternatively, the method can be implemented using dedicated hardware components, for example as an electric circuit for each of means discussed previously in this paragraph. The device can furthermore have interfaces (not shown) to enable it to register parameters for controlling and processing the multimedia data, for instance, and to convey them to other processing units.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for computer-aided annotating of multimedia data including a sequence of digitized images, comprising:
    analyzing, executed by a computer, the multimedia data to detect objects in the multimedia data;
    assigning, executed by the computer, each object to a role, with role assigning being ascertained by processing context information representing at least one model of the multimedia data; and
    assigning, executed by the computer, the objects to object classes, with each object class formed of classified objects identified as similar,
    wherein a pair of the classified objects in one of the object classes are identified as similar using an object-specific similarity measure based on at least one of visual, phonetic and geometric characteristics of the classified objects.

2. The method as claimed in claim 1, wherein the context information is ascertained from an information source different from the multimedia data.

3. The method as claimed in claim 1, wherein an identity is ascertained as a further step for a respective role.

4. The method as claimed in claim 3, further comprising ascertaining an identity for an ascertained role by processing the context information.

5. The method as claimed in claim 4, further comprising assigning an ascertained identity to at least one of a corresponding object and a corresponding object class assigned to the ascertained role.

6. The method as claimed in claim 5, wherein the context information includes information about identities involved in the multimedia data.

7. The method as claimed in claim 6, wherein the context information includes statistical knowledge about a context of the multimedia data.

8. The method as claimed in claim 7, further comprising ascertaining a frequency of occurrence of one of the objects in the multimedia data.

9. The method as claimed in claim 8, wherein the context information includes logical limitations.

10. The method as claimed in claim 9, wherein the context information includes data from databases containing information about the multimedia data.

11. A device for the computer-aided annotating of multimedia data comprising a sequence of digitized images, comprising:
- means for analyzing, executed by a computer, the multimedia data to detect objects in the multimedia data;
- means for assigning, executed by the computer, each object to a role, with role assigning being ascertained by processing context information representing at least one model of the multimedia data; and
- means for assigning, executed by the computer, the objects to object classes, with each object class formed of classified objects identified as similar,
- wherein a pair of the classified objects in one of the object classes are identified as similar using an object-specific similarity measure based on at least one of visual, phonetic and geometric characteristics of the classified objects.

12. The device as claimed in claim 11, wherein the context information is ascertained from an information source different from the multimedia data.

13. The device as claimed in claim 11, wherein an identity is ascertained as a further step for a respective role.

14. The device as claimed in claim 13, further comprising ascertaining an identity for an ascertained role by processing the context information.

15. The device as claimed in claim 14, further comprising assigning an ascertained identity to at least one of a corresponding object and a corresponding object class assigned to the ascertained role.

16. A device for the computer-aided annotating of multimedia data comprising a sequence of digitized images, comprising:
- a memory at least temporarily storing the multimedia data; and
- a processor programmed to analyze the multimedia data, detect objects in the multimedia data, assign each object to a role, with role assigning being ascertained by processing, executed by the processor, context information representing at least one model of the multimedia data, and assign the objects to object classes, with each object class formed of classified objects identified as similar,
- wherein a pair of the classified objects in one of the object classes are identified as similar using an object-specific similarity measure based on at least one of visual, phonetic and geometric characteristics of the classified objects.

* * * * *

UNITED STATES PATENT AND TRADEMARK OFFICE
CERTIFICATE OF CORRECTION

| | | |
|---|---|---|
| PATENT NO. | : 9,020,268 B2 | Page 1 of 1 |
| APPLICATION NO. | : 13/508312 | |
| DATED | : April 28, 2015 | |
| INVENTOR(S) | : Andreas Hutter et al. | |

It is certified that error appears in the above-identified patent and that said Letters Patent is hereby corrected as shown below:

On the title page

Column 1, Item [73] (Assignee), Delete "Siemens Aktiengsellschaft," and insert
-- Siemens Aktiengesellschaft, --, therefor Signed and Sealed this
Seventeenth Day of May, 2016

Michelle K. Lee
*Director of the United States Patent and Trademark Office*